United States Patent
Jung et al.

(10) Patent No.: US 10,271,050 B2
(45) Date of Patent: Apr. 23, 2019

(54) METHODS, SYSTEMS AND DEVICES INCLUDING AN ENCODER FOR IMAGE PROCESSING

(71) Applicants: Young Beom Jung, Seoul (KR); Hyuk Jae Jang, Suwon-si (KR)

(72) Inventors: Young Beom Jung, Seoul (KR); Hyuk Jae Jang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 372 days.

(21) Appl. No.: 14/970,571

(22) Filed: Dec. 16, 2015

(65) Prior Publication Data

US 2016/0198156 A1    Jul. 7, 2016

(30) Foreign Application Priority Data

Jan. 5, 2015  (KR) .................. 10-2015-0000521

(51) Int. Cl.
| | | |
|---|---|---|
| *H04N 19/124* | (2014.01) | |
| *H04N 19/176* | (2014.01) | |
| *H04N 19/182* | (2014.01) | |
| *H04N 19/136* | (2014.01) | |
| H04N 19/196 | (2014.01) | |

(52) U.S. Cl.
CPC ......... *H04N 19/124* (2014.11); *H04N 19/136* (2014.11); *H04N 19/176* (2014.11); *H04N 19/182* (2014.11); *H04N 19/196* (2014.11)

(58) Field of Classification Search
CPC .. H04N 19/124; H04N 19/136; H04N 19/176; H04N 19/182; H04N 19/196
See application file for complete search history.

(56) References Cited

U.S. PATENT DOCUMENTS

| 6,173,012 | B1 | 1/2001 | Katta et al. | |
|---|---|---|---|---|
| 8,279,924 | B2 | 10/2012 | Chen et al. | |
| 8,331,438 | B2 * | 12/2012 | Chang | H04N 19/159 |
| | | | | 375/240.03 |
| 8,687,707 | B2 | 4/2014 | Han | |
| 8,811,487 | B2 | 8/2014 | Kim et al. | |
| 2003/0112333 | A1* | 6/2003 | Chen | H04N 17/004 |
| | | | | 348/192 |
| 2012/0183053 | A1* | 7/2012 | Lu | H04N 19/176 |
| | | | | 375/240.03 |

(Continued)

FOREIGN PATENT DOCUMENTS

| JP | 2013-157662 | 8/2013 |
|---|---|---|
| KR | 1020120088307 A | 8/2012 |
| KR | 1020130051384 A | 5/2013 |

*Primary Examiner* — Joseph Suh

(74) *Attorney, Agent, or Firm* — Myers Bigel, P.A.

(57) ABSTRACT

A method of operating an encoder is provided. The method includes generating predicted spatial-domain block values for current spatial-domain block pixel values, generating residual spatial-domain block values based on differences between the current spatial-domain block pixel values and the predicted spatial-domain block values, calculating a representative value of the residual spatial-domain block values, selecting a quantization parameter corresponding to the representative value from among a plurality of quantization parameters, and quantizing the residual spatial-domain block values using the selected quantization parameter.

20 Claims, 9 Drawing Sheets

(56) References Cited

U.S. PATENT DOCUMENTS

| | | | |
|---|---|---|---|
| 2013/0034149 A1* | 2/2013 | Karuchula | H04N 7/50 375/240.03 |
| 2013/0034152 A1 | 2/2013 | Song et al. | |
| 2013/0243083 A1* | 9/2013 | Sezer | H04N 19/60 375/240.02 |
| 2013/0251032 A1* | 9/2013 | Tanaka | H04N 19/44 375/240.03 |
| 2013/0343464 A1 | 12/2013 | Van der Auwera et al. | |
| 2014/0056362 A1 | 2/2014 | Mrak et al. | |
| 2014/0153640 A1* | 6/2014 | Zhao | H04N 19/172 375/240.03 |
| 2014/0169452 A1* | 6/2014 | Lim | H04N 19/176 375/240.03 |
| 2014/0219339 A1 | 8/2014 | Park | |
| 2015/0078674 A1* | 3/2015 | Jiang | G06T 9/00 382/251 |
| 2015/0093011 A1* | 4/2015 | Gaudio | G06T 7/0012 382/132 |
| 2015/0110191 A1* | 4/2015 | Yang | H04N 19/105 375/240.16 |
| 2015/0172661 A1* | 6/2015 | Dong | H04N 19/51 375/240.03 |
| 2015/0189327 A1* | 7/2015 | Kondo | H04N 19/00 382/233 |
| 2015/0326863 A1* | 11/2015 | Francois | H04N 19/176 375/240.24 |
| 2015/0341675 A1* | 11/2015 | Su | H04N 19/117 375/240.15 |
| 2015/0373329 A1* | 12/2015 | Jiang | H04N 19/46 375/240.03 |
| 2016/0007038 A1* | 1/2016 | Chou | H04N 19/46 375/240.03 |
| 2016/0094803 A1* | 3/2016 | Possos | H04N 7/012 348/448 |
| 2016/0156926 A1* | 6/2016 | Hashimoto | H04N 19/61 375/240.16 |
| 2016/0261885 A1* | 9/2016 | Li | H04N 19/176 |
| 2017/0264904 A1* | 9/2017 | Koval | H04N 19/159 |

* cited by examiner

FIG. 4

TABLE

| QP  | 1    | 2    | 3    | 4   | 5    | 6    | 7    | 8    | 9    | 10  | 11   | 12   | 13   |
|-----|------|------|------|-----|------|------|------|------|------|-----|------|------|------|
| QSS | 0.71 | 0.81 | 0.90 | 1   | 1.12 | 1.25 | 1.41 | 1.59 | 1.78 | 2   | 2.25 | 2.50 | 2.81 |

| QP  | 14   | 15   | 16 | 17  | 18 | 19   | 20   | 21   | 22 | 23 | 24 | 25   | 26   |
|-----|------|------|----|-----|----|------|------|------|----|----|----|------|------|
| QSS | 3.18 | 3.56 | 4  | 4.5 | 5  | 5.62 | 6.37 | 7.12 | 8  | 9  | 10 | 11.2 | 12.7 |

| QP  | 27   | 28 | 29 | 30 | 31   | 32   | 33   | 34 | 35 | 36 | 37 | 38 | 39 |
|-----|------|----|----|----|------|------|------|----|----|----|----|----|----|
| QSS | 14.2 | 16 | 18 | 20 | 22.5 | 25.5 | 28.5 | 32 | 36 | 40 | 45 | 51 | 57 |

| QP  | 40 | 41 | 42 | 43 | 44  | 45  | 46  | 47  | 48  | 49  | 50  | 51  |
|-----|----|----|----|----|-----|-----|-----|-----|-----|-----|-----|-----|
| QSS | 64 | 72 | 80 | 90 | 102 | 114 | 128 | 144 | 160 | 180 | 204 | 228 |

| 50 | 50 | 50  | 50  |
|----|----|-----|-----|
| 50 | 50 | 50  | 50  |
| 50 | 50 | 140 | 140 |
| 50 | 50 | 140 | 140 |

−

B20

| 50 | 50 | 50 | 50 |
|----|----|----|----|
| 50 | 50 | 50 | 50 |
| 50 | 50 | 50 | 50 |
| 50 | 50 | 50 | 50 |

=

B30

| 0 | 0 | 0  | 0  |
|---|---|----|----|
| 0 | 0 | 0  | 0  |
| 0 | 0 | 90 | 90 |
| 0 | 0 | 90 | 90 |

FIG. 6

METHOD1
QP 43

Quantized Coefficient

| 0 | 0 | 0 | 0 |
|---|---|---|---|
| 0 | 0 | 0 | 0 |
| 0 | 0 | 1 | 1 |
| 0 | 0 | 1 | 1 |

41-1

| 50 | 50 | 50 | 50 |
|---|---|---|---|
| 50 | 50 | 50 | 50 |
| 50 | 50 | 140 | 140 |
| 50 | 50 | 140 | 140 |

METHOD2
QP 31

Quantized Coefficient

| 0 | 0 | 0 | 0 |
|---|---|---|---|
| 0 | 0 | 0 | 0 |
| 0 | 0 | 4 | 4 |
| 0 | 0 | 4 | 4 |

41-2

| 50 | 50 | 50 | 50 |
|---|---|---|---|
| 50 | 50 | 50 | 50 |
| 50 | 50 | 140 | 140 |
| 50 | 50 | 140 | 140 |

METHOD3
QP 24

Quantized Coefficient

| 0 | 0 | 0 | 0 |
|---|---|---|---|
| 0 | 0 | 0 | 0 |
| 0 | 0 | 9 | 9 |
| 0 | 0 | 9 | 9 |

41-3

| 50 | 50 | 50 | 50 |
|---|---|---|---|
| 50 | 50 | 50 | 50 |
| 50 | 50 | 140 | 140 |
| 50 | 50 | 140 | 140 |

| 50 | 50 | 60 | 60 |
|---|---|---|---|
| 50 | 50 | 60 | 60 |
| 50 | 50 | 140 | 140 |
| 50 | 50 | 140 | 140 |

−

20A

| 50 | 50 | 50 | 50 |
|---|---|---|---|
| 50 | 50 | 50 | 50 |
| 50 | 50 | 50 | 50 |
| 50 | 50 | 50 | 50 |

=

30A

| 0 | 0 | 10 | 10 |
|---|---|---|---|
| 0 | 0 | 10 | 10 |
| 0 | 0 | 90 | 90 |
| 0 | 0 | 90 | 90 |

Grouping : {0, 10, 90}
        └─ EXCLUDED

GREATEST COMMON DIVISOR OF 10 AND 90=10

| | 10B | | |
|---|---|---|---|
| 50 | 61 | 59 | 60 |
| 50 | 60 | 61 | 59 |
| 50 | 50 | 140 | 140 |
| 50 | 50 | 140 | 140 |

−

| | 20B | | |
|---|---|---|---|
| 50 | 50 | 50 | 50 |
| 50 | 50 | 50 | 50 |
| 50 | 50 | 50 | 50 |
| 50 | 50 | 50 | 50 |

=

| | 30B | | |
|---|---|---|---|
| 0 | 11 | 9 | 10 |
| 0 | 10 | 11 | 9 |
| 0 | 0 | 90 | 90 |
| 0 | 0 | 90 | 90 |

Grouping : {0, 9, 10, 11, 90}
EXCLUDED ◄┘         └► REPRESENTATIVE VALUE : 10
GREATEST COMMON DIVISOR OF 10 AND 90=10
QP=24

FIG. 11

| | 10C | | |
|---|---|---|---|
| 50 | 51 | 52 | 53 |
| 51 | 52 | 60 | 60 |
| 60 | 60 | 140 | 140 |
| 53 | 60 | 140 | 140 |

−

| | 20C | | |
|---|---|---|---|
| 50 | 50 | 50 | 50 |
| 50 | 50 | 50 | 50 |
| 50 | 50 | 50 | 50 |
| 50 | 50 | 50 | 50 |

=

| | 30C | | |
|---|---|---|---|
| 0 | 1 | 2 | 3 |
| 1 | 2 | 10 | 10 |
| 10 | 10 | 90 | 90 |
| 3 | 10 | 90 | 90 |

Grouping : {0, 1, 2, 3, 10, 90}
                └► EXCLUDED
GREATEST COMMON DIVISOR OF 10 AND 90=10
QP=24

METHODS, SYSTEMS AND DEVICES INCLUDING AN ENCODER FOR IMAGE PROCESSING

CROSS-REFERENCE TO RELATED APPLICATIONS

This application claims priority under 35 U.S.C. § 119(a) from Korean Patent Application No. 10-2015-0000521 filed on Jan. 5, 2015, the disclosure of which is hereby incorporated by reference in its entirety.

BACKGROUND

An encoder is a device or method for transforming a form or format of information for standardization, secrecy, increase of processing speed, memory space saving, and so on. A quantization parameter is a numerical value for adjusting the degree of quantization in an encoder. An encoder may quantize input data using a quantization parameter.

Conventional encoders determine an optimal encoding quantization parameter using rate-distortion optimization (RDO) within a range of quantization parameters by comparing the cost of all possible candidates. However, an encoder that performs RDO may use a significant amount of computation to determine an optimal encoding quantization parameter without certainty that the quantization parameter determined by the encoder is the optimal one.

SUMMARY

According to some embodiments of the inventive concept, there is provided a method of operating an encoder. The method includes generating predicted spatial-domain block values for current spatial-domain block pixel values, generating residual spatial-domain block values based on differences between the current spatial-domain block pixel values and the predicted spatial-domain block values, calculating a representative value of the residual spatial-domain block values, selecting a quantization parameter corresponding to the representative value from among a plurality of quantization parameters, and quantizing the residual spatial-domain block values using the selected quantization parameter.

The calculating the representative value may include grouping the residual spatial-domain block values into a plurality of groups, calculating a greatest common divisor of grouped values, and determining the greatest common divisor as the representative value. Grouping the residual spatial-domain block values may include excluding values less than a reference value from the residual spatial-domain block values.

In some embodiments, the calculating the representative value may include calculating a standard deviation of the residual spatial-domain block values and determining the standard deviation as the representative value. Calculating the representative value may include calculating a mean of absolute differences (MAD) of the residual spatial-domain block values and determining the MAD as the representative value. The plurality of quantization parameters may be stored in a table.

In some embodiments, the calculating the representative value may include calculating a sum of absolute differences (SAD) of the current spatial-domain block pixel values and a sum of absolute transformed differences (SATD) of frequency domain values derived from the current spatial-domain block pixel values, comparing the SAD with the SATD and generating a control signal when the SAD is equal to or less than the SATD, and calculating the representative value of the residual spatial-domain block values in response to the control signal. The method may further include inverse-quantizing quantized block values using the selected quantization parameter in response to the control signal.

According to some embodiments of the inventive concept, there is provided a system on chip including an image signal processor circuit configured to transform first data in a first format into second data in a second format and an encoder configured to encode the second data in the second format.

The encoder may include a mode decision block configured to generate a control signal having either of a first state or a second state and to generate predicted spatial-domain block values for current spatial-domain block pixel values corresponding to the second data, a subtractor configured to generate residual spatial-domain block values based on differences between the current spatial-domain block pixel values and the predicted spatial-domain block values, and/or a transform and quantization block configured to calculate a representative value of the residual spatial-domain block values in response to the control signal having the first state, to select a quantization parameter corresponding to the representative value from among a plurality of quantization parameters, and to quantize the residual spatial-domain block values using the selected quantization parameter.

The transform and quantization block may skip a transform operation of transforming the residual spatial-domain block values into frequency domain values and calculate the representative value of the residual spatial-domain block values in response to the control signal having the first state. The transform and quantization block may perform the transform operation in response to the control signal having the second state and quantize transformed residual blocks resulting from the transform operation using rate-distortion optimization or a given quantization parameter.

The mode decision block may include a transform control signal generator configured to generate a first value using the current spatial-domain block pixel values, to generate a second value using frequency domain values derived from the current spatial-domain block pixel values, to compare the first value with the second value, to generate the control signal having the first state when the first value is equal to or less than the second value, and/or to generate the control signal having the second state. The first value may be a SAD of the current spatial-domain block pixel values and the second value may be a SATD of the frequency domain values derived from the current spatial-domain block pixel values.

According to further embodiments of the inventive concept, there is provided a mobile computing device including a camera, an image signal processor circuit configured to transform first data output in a first format from the camera into second data in a second format, and an encoder configured to encode the second data in the second format.

The encoder may include a mode decision block configured to generate a control signal having either of a first state and a second state and to generate predicted spatial-domain block values for current spatial-domain block pixel values corresponding to the second data; a subtractor configured to generate residual spatial-domain block values based on differences between the current spatial-domain block pixel values and the predicted spatial-domain block values; and a transform and quantization block configured to calculate a representative value of the residual spatial-domain block values in response to the control signal having the first state, to select a quantization parameter corresponding to the representative value from among a plurality of quantization parameters, and/or to quantize the residual spatial-domain block values using the selected quantization parameter.

The transform and quantization block may skip a transform operation of transforming the residual spatial-domain block values into frequency domain values and calculate the representative value of the residual spatial-domain block values in response to the control signal having the first state. The transform and quantization block may perform the transform operation in response to the control signal having the second state and quantize transformed residual blocks resulting from the transform operation using rate-distortion optimization or a given quantization parameter.

In some embodiments, the transform and quantization block may group the residual spatial-domain block values into a plurality of groups, calculate a greatest common divisor of grouped values, determine the greatest common divisor as the representative value, and exclude values less than a reference value from the residual spatial-domain block values. In some embodiments, the transform and quantization block may calculate a standard deviation of the residual spatial-domain block values and determine the standard deviation as the representative value.

In some embodiments, the transform and quantization block may calculate a MAD of the residual spatial-domain block values and determine the MAD as the representative value.

Some embodiments of the present inventive concept are directed to an encoder circuit configured to process current spatial-domain block pixel values. The encoder circuit may include a memory circuit, and a processor circuit configured to execute computer program instructions from the memory circuit to perform various operations. The operations performed by the processor circuit of the encoder may include determining residual spatial-domain block values based on respective differences between the current spatial-domain block pixel values and predicted spatial-domain block values, determining a representative value associated with the residual spatial-domain block values based on a transform, determining a quantization step size based on the representative value, selecting a quantization parameter based on the quantization step size, and/or quantizing the residual spatial-domain block values based on the quantization parameter.

In some embodiments, the transform may include determining a Sum of Absolute Differences (SAD) value based on the current spatial-domain block pixel values and determining a Sum of Absolute Transformed Differences (SATD) value based on frequency domain values derived from the current spatial-domain block pixel values. Time domain to frequency domain transformation of the residual spatial-domain block values may be performed, in response to the SAD value being greater than the SATD value. The transform may include skipping time domain to frequency domain transformation of the residual spatial-domain block values, in response to the SAD value being less than or equal to the SATD value.

In some embodiments, the transform may include determining a group of residual spatial-domain block values including ones of the residual spatial-domain block values exceeding a threshold, and selecting the representative value as a greatest common divisor of the group of residual spatial-domain block values. In some embodiments, the transform may include determining a standard deviation value of the residual spatial-domain block values, and selecting the representative value as the standard deviation value. In some embodiments, the transform may include determining a mean of absolute differences (MAD) value of the residual spatial-domain block values, and selecting the representative value as the MAD value. In some embodiments, selecting the quantization parameter based on the quantization step size may include selecting a quantization parameter out of a plurality of quantization parameters that is nearest in value to the quantization step size that was determined. The quantization parameter may be selected from a plurality of quantization parameters stored in the memory circuit.

It is noted that aspects of the disclosure described with respect to one embodiment, may be incorporated in a different embodiment although not specifically described relative thereto. That is, all embodiments and/or features of any embodiment may be combined in any way and/or combination. These and other objects and/or aspects of the present invention are explained in detail in the specification set forth below.

BRIEF DESCRIPTION OF THE DRAWINGS

The above and other features and advantages of the inventive concept will become more apparent by describing in detail embodiments thereof with reference to the attached drawings in which:

FIG. 4 is a diagram of a table including quantization parameters corresponding to representative values according to some embodiments of the inventive concept;

FIG. 5 is a conceptual diagram for explaining the operation of a subtractor illustrated in FIG. 2;

FIG. 6 is a diagram showing a quantization parameter corresponding to a representative value calculated according to some embodiments of the inventive concept and a quantized coefficient;

FIG. 7 is a diagram showing a quantization parameter corresponding to a representative value calculated according to some embodiments of the inventive concept and a quantized coefficient;

FIG. 8 is a diagram showing a quantization parameter corresponding to a representative value calculated according to further embodiments of the inventive concept and a quantized coefficient;

FIG. 9 is a conceptual diagram of a method of determining a representative value using grouping according to some embodiments of the inventive concept;

FIG. 10 is a conceptual diagram of a method of determining a representative value using grouping according to some embodiments of the inventive concept;

FIG. 11 is a conceptual diagram of a method of determining a representative value using grouping according to further embodiments of the inventive concept;

DETAILED DESCRIPTION

Figure 1:
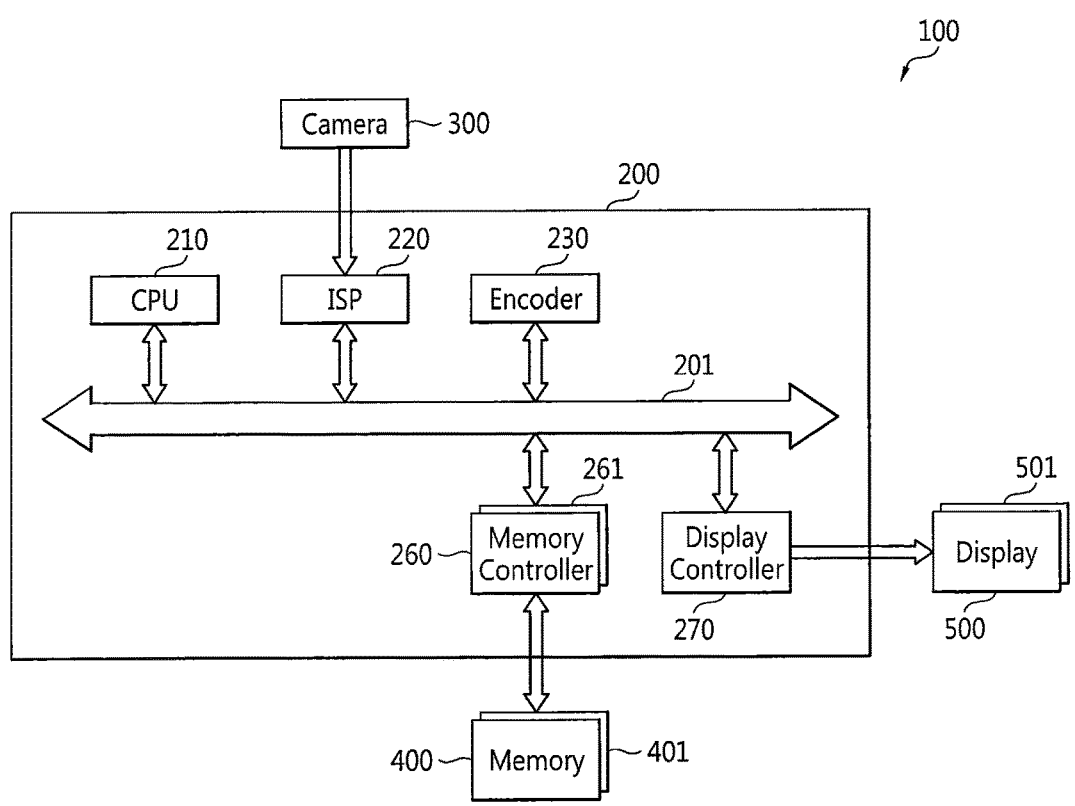
FIG. 1 is a block diagram of a data processing system according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Conventional image processing uses Rate Distortion Optimization (RDO) that may require repeated calculations. The present inventive concept arises from the recognition that these repeated calculations may be computationally intensive but may not necessarily guarantee a quantization parameter value that is in fact optimal. Embodiments of the inventive concept relate to an encoder, and more particularly, to a method of operating an encoder configured to determine an optimal encoding quantization parameter corresponding to a representative of values of a spatial domain residual block among quantization parameters stored in a table in transform skip mode and to devices including the encoder.

FIG. 1 is a block diagram of an image processing and/or data processing system 100 according to some embodiments of the inventive concept. Referring to FIG. 1, the data processing system 100 may include a controller 200, a camera 300, at least one memory 400 and/or 401, and a display 500. The data processing system 100 may also include a touch screen 501. Although the display 500, memory 400, and the camera 200 are illustrated in FIG. 1 as being external to the controller 200, one or more of these components may be integrated with the controller 200 and/or with any of the components of the controller 200. For example, memory 400 may be integrated with the encoder 230. Any or all of the components of FIG. 1 may be packaged together.

The data processing system 100 may be implemented as a personal computer (PC) or a mobile computing device such as a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The controller 200 may control the operations of the camera 300, the least one memory 400 and/or 401, and the display 500. The controller 200 may also control the operation of the touch screen 501. The controller 200 may be implemented as an integrated circuit (IC), a mother board, a system on chip (SoC), an application processor (AP), or a mobile AP.

The controller 200 may include bus architecture 201, a central processing unit (CPU) 210, an image signal processor (ISP) 220, an encoder 230, at least one memory controller 260 and/or 261, and a display controller 270. The bus architecture 201 may be implemented as advanced microcontroller bus architecture (AMBA®), an advanced high-performance bus (AHB), an advanced peripheral bus (APB), an advanced extensible interface (AXI), or an advanced system bus (ASB), but the inventive concept is not restricted to these examples.

The CPU 210 may control the operations of at least one among the ISP 220, the encoder 230, the at least one memory controller 260 and/or 261, and the display controller 270 through the bus architecture 201.

The ISP 220 may control the transformation of a format of image data output from the camera 300, noise reduction for the image data, and image enhancement of an image. In detail, the ISP 220 may transform first data in a first format, which has been output from the camera 300, into second data in a second format, different from the first format. The first format may be, for example, a Bayer format and the second format may be a YUV format, a YCbCr format, or an RGB format. The camera may include a complementary metal oxide semiconductor (CMOS) image sensor chip.

Although the ISP 220 is formed within the controller 200 in the embodiments illustrated in FIG. 1, the ISP 220 may be formed in an independent chip between the controller 200 and the camera 300 in other embodiments. The ISP 220 may be placed within the camera 300 and the CMOS image sensor chip and the ISP 220 may be packaged into a single package in further embodiments.

The encoder and/or encoder circuit 230 may generate predicted spatial-domain block values for current spatial-domain block pixel values, may generate residual spatial-domain block values based on differences between the current spatial-domain block pixel values and the predicted spatial-domain block values, may calculate a representative value of the residual spatial-domain block values, may select a quantization parameter corresponding to the representative value from among a plurality of quantization parameters, and may encode or quantize the residual spatial-domain block values using the selected quantization parameter. The encoder 230 may support high efficiency video coding (HEVC) standards, but the inventive concept is not restricted to this example. The structure and operations of the encoder 230 will be described in detail with reference to FIGS. 2 through 13 later.

The encoder 230 may encode image data (e.g., a bitstream) output from the ISP 220. Encoded image data (e.g., an encoded bitstream) may be stored in at least one memory 400 and/or 401 based on operations performed by at least one memory controller 260 and/or 261.

The at least one memory controller 260 and/or 261 may read encoded image data (e.g., an encoded bitstream) from the least one memory 400 and/or 401. The encoded image data (e.g., an encoded bitstream) output from the at least one memory controller 260 and/or 261 may be decoded by a decoder (not shown). Decoded image data may be transmitted to the display 500 through the display controller 270.

A codec may include the encoder 230 and the decoder, but the operation of the encoder 230 included in the codec will be described here. The encoder 230 may function as a compressor and the decoder may function as a decompressor.

The at least one memory controller 260 and/or 261 may control a data access operation on the least one memory 400 and/or 401 according to the control of the CPU 210. The data access operation may include a write operation for wiring data to the memory 400 or 401 and/or a read operation for reading data from the memory 400 or 401.

The least one memory 400 and/or 401 may include volatile memory and/or non-volatile memory. The volatile memory may be random access memory (RAM), dynamic RAM (DRAM), static RAM (SRAM), and/or buffer memory. The non-volatile memory may be flash memory, magnetic RAM (MRAM), spin-transfer torque MRAM, ferroelectric RAM (FeRAM), phase-change RAM (PRAM), and/or resistive RAM (RRAM). The flash memory may be NAND-type or NOR-type flash memory that stores at least one bit.

The memory 400 may be formed of DRAM and the memory 401 may be formed of flash-based memory. At this time, the memory controller 260 may be a DRAM controller and the memory controller 261 may be a flash-based memory controller. The flash-based memory may be implemented as a solid state drive or solid state disk (SSD), a multimedia card (MMC), an embedded MMC (eMMC), or a universal flash storage (UFS).

The display controller 270 may transmit data from the CPU 210 or the encoder 230 to the display 500 according to according to operations performed by the CPU 210.

The camera 300 may include a CMOS image sensor chip. The CMOS image sensor chip may output image data corresponding to an optical image of an object to the ISP 220. The camera 300 may output image data to the ISP 220 through a mobile industry processor interface (MIPI®) camera serial interface (CSI).

The display 500 may display data received from the display controller 270. A touch screen 501 may serve as a user interface to the image and/or data processing system 100 and may be used to select or activate a graphics user interface (GUI) displayed on the display 500. The touch screen 501 may generate a user touch input for controlling the operation of the controller 200 and may send the user touch input to the CPU 210 for processing. A GUI may be displayed on the display 500 according to the control of an application program run by the CPU 210.

Figure 2:
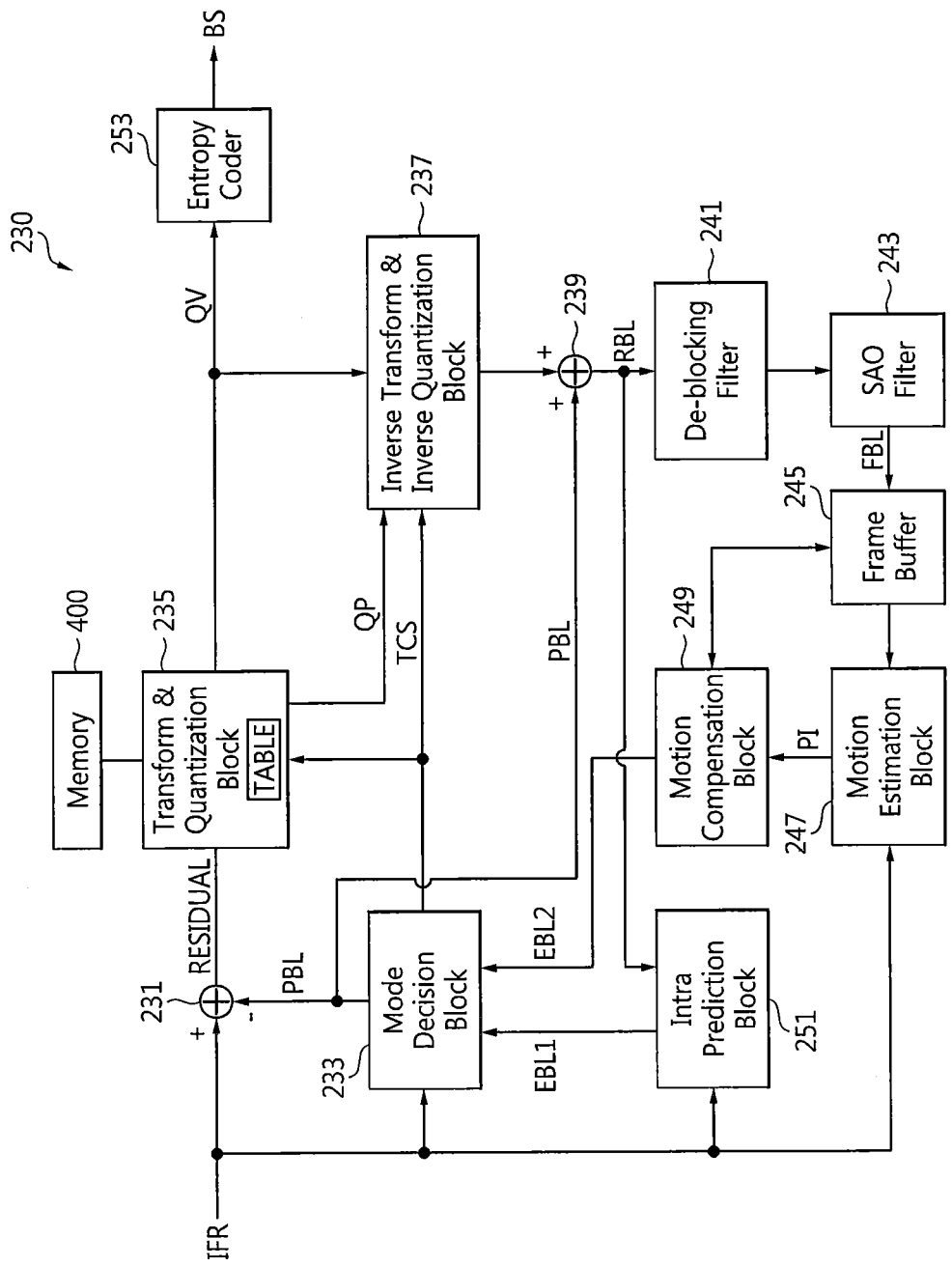
FIG. 2 is a block diagram of an encoder illustrated in FIG. 1.

FIG. 2 is a block diagram of the encoder 230 illustrated in FIG. 1. Referring to FIG. 2, the encoder 230 may include a subtractor 231, a mode decision block 233, a transform and quantization block 235, an inverse transform and inverse quantization block 237, an adder 239, a de-blocking filter 241, a sample adaptive offset (SAO) filter 243, a frame buffer 245, a motion estimation block 247, a motion compensation block 249, an intra prediction block 251, and an entropy coder 253. The memory 400 of FIG. 1 may be coupled to the transform and quantization block 235 and may be used to store a quantization table (TABLE) including a plurality of quantization parameters and associated quantization step sizes.

The subtractor 231 may calculate differences between values (hereinafter, referred to as "current spatial-domain block pixel values") of a current spatial-domain block Input Frame (IFR) targeted to be currently processed among a plurality of spatial-domain blocks included in an input frame and values (hereinafter, referred to as "predicted spatial-domain block values") of a predicted spatial-domain block PBL output from the mode decision block 233 and may generate values (hereinafter, referred to as "residual spatial-domain block values") of a residual spatial-domain block RESIDUAL corresponding to a calculation result. The input frame may be a frame in a YUV format, a frame in a YCbCr format, and/or a frame in an RGB format, but the inventive concept is not restricted to these examples. A block may include m*n pixels, where "m" and "n" may be natural numbers of at least 2 and m=n or min.

As described above, pixels may be data in YUV format, data in YCbCr format, or data in RGB format but are not restricted thereto. For example, a block may include 16*16 pixels, 32*32 pixels, or 64*64 pixels, but the inventive concept is not restricted to these examples.

The subtractor 231 may calculate differences for each calculation block and output the differences for each block. For example, the size of the calculation block may be smaller than that of the block. For instance, when the calculation block includes 4*4 pixels, the block may include 16*16 pixels, but the inventive concept is not restricted to this example.

The mode decision block 233 may receive the current spatial-domain block IFR, a first predicted block EBL1, and a second predicted block EBL2. The mode decision block 233 may output either the first predicted block EBL1 or the second predicted block EBL2 as the predicted spatial-domain block PBL. In addition, the mode decision block 233 may decide whether performing transformation of the residual spatial-domain block RESIDUAL is efficient compared to not performing the transformation, and may generate a control signal TCS according to the decision of the comparison result. The control signal TCS may be an instruction signal for instructing to perform or not to perform the transformation. The control signal TCS may be a flag having a first state or a second state, but the inventive concept is not restricted to this example.

Still referring to FIG. 2, in some embodiments, an encoder circuit of FIG. 2 may include a memory circuit and a processor circuit. The processor circuit may be the CPU 210 and/or the ISP 220 of FIG. 1, or may be a separate specialized processor. The processor circuit associated with the encoder circuit may perform operations such as determining residual spatial-domain block values based on a difference between the current spatial-domain block pixel values and predicted spatial-domain block values, determining a representative value associated with the residual spatial-domain block values based on a transform, determining a quantization step size based on the representative value, selecting a quantization parameter based on the quantization step size, and/or quantizing the residual spatial-domain block values based on the quantization parameter. The transform may include comparing a Sum of Absolute Differences (SAD) value with a Sum of Absolute Transformed Differences (SATD) value based on the current spatial-domain block pixel values. Time domain to frequency domain transformation of the residual spatial-domain block values may be performed, if the SAD value is greater than the SATD value. The transform may include skipping time domain to frequency domain transformation of the residual spatial-domain block values, if the SAD value is less than or equal to the SATD value.

In some embodiments, the transform may include determining a group of residual spatial-domain block values including ones of the residual spatial-domain block values exceeding a threshold, and selecting the representative value as a greatest common divisor of the group of residual spatial-domain block values. In some embodiments, the transform may include determining a standard deviation value of the residual spatial-domain block values, and selecting the representative value as the standard deviation value. In some embodiments, the transform may include determining a mean of absolute differences (MAD) value of the residual spatial-domain block values, and selecting the representative value as the MAD value. In some embodiments, selecting the quantization parameter based on the quantization step size may include selecting a quantization parameter out of a plurality of quantization parameters that is nearest in value to the quantization step size that was determined. The quantization parameter may be selected from a plurality of quantization parameters stored in the memory circuit. The various transforms will be discussed in further detail below with respect to FIG. 4 to FIG. 12.

Figure 3:
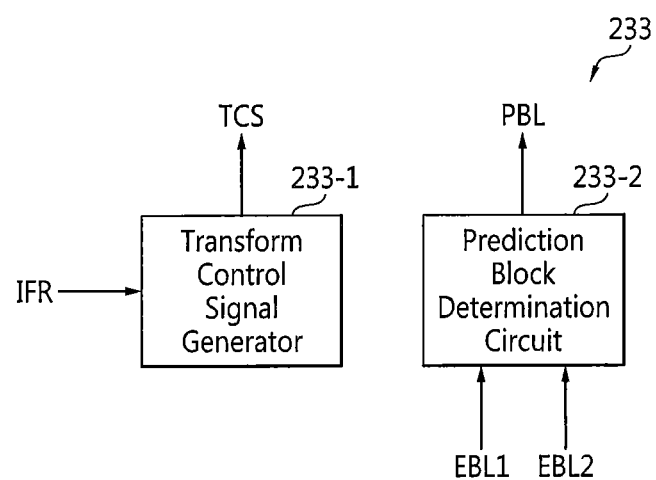
FIG. 3 is a block diagram of a mode decision block illustrated in FIG. 2.

FIG. 3 is a block diagram of the mode decision block 233 illustrated in FIG. 2. Referring to FIGS. 2 and 3, the mode decision block 233 may include a transform control signal generator 233-1 and a prediction block determination circuit 233-2.

The transform control signal generator 233-1 may generate a first value using current spatial-domain block pixel values of current spatial-domain block IFR and may generate a second value using frequency domain values derived from the current spatial-domain block pixel values. The transform control signal generator 233-1 may compare the first value with the second value and may generate the control signal TCS having the first state when the first value is less than the second value and the control signal TCS having the second state when the first value is equal to or greater than the second value.

The first value may be the sum of absolute differences (SAD) of the current spatial-domain block pixel values. The second value may be the sum of absolute transformed differences (SATD) of the frequency domain values derived from (or corresponding to) the current spatial-domain block pixel values. SAD and SATD will be described in detail with reference to FIG. 12 later.

The transform and quantization block 235 may skip the transformation of a block in response to the control signal TCS having the first state. The inverse transform and inverse quantization block 237 may also skip the transformation of a block in response to the control signal TCS having the first state. Here, the transformation refers to a transform operation. However, the transform and quantization block 235 may perform transformation on a block in response to the control signal TCS having the second state. The inverse transform and inverse quantization block 237 may also perform transformation on a block in response to the control signal TCS having the second state.

The first state may be one between a low level and a high level and the second state may be the other one between them. The low level may refer to data "0" or logic "0" and the high level may refer to data "1" or logic "1".

The prediction block determination circuit 233-2 may output either the first predicted block EBL1 or the second predicted block EBL2 as the predicted spatial-domain block PBL. In detail, when a first difference between an encoding result value obtained by encoding the first predicted block EBL1 and a wanted result value is less than a second difference between an encoding result value obtained by encoding the second predicted block EBL2 and the wanted result value, the prediction block determination circuit 233-2 may output the first predicted block EBL1 as the predicted spatial-domain block PBL. However, when the first difference is equal to or greater than the second difference, the prediction block determination circuit 233-2 may output the second predicted block EBL2 as the predicted spatial-domain block PBL. The transform and quantization block 235 may skip or perform the transformation of a block according to the state of the control signal TCS.

As described above, when the control signal TCS has the first state, the transform and quantization block 235 may calculate a representative value of residual spatial-domain block values without performing time domain-to-frequency domain transformation on the residual spatial-domain block RESIDUAL.

The transform and quantization block 235 may select a quantization parameter corresponding to the calculated representative value from among a plurality of quantization parameters and may quantize the residual spatial-domain block values using the selected quantization parameter, thereby generating a quantized block QV. The calculating the representative value will be described in detail with reference to FIGS. 5 through 11. A skip mode may be defined when the control signal TCS has the first state.

The transform and quantization block 235 of FIG. 2 may include a table TABLE illustrated in FIG. 4 that stores a plurality of quantization parameters and associated quantization step sizes. Although the table TABLE is included in the transform and quantization block 235 in the embodiments illustrated in FIG. 2, the table TABLE may be implemented at any place in the system that can be accessed by the transform and quantization block 235. As an example, the table TABLE may be included in the memory 400 of FIG. 1 and FIG. 2.

Transformation performed by the transform and quantization block 235 may refer to transform a spatial coordinate from a time domain into a frequency domain. The transformation may be discrete cosine transform (DCT) but is not restricted thereto.

When the control signal TCS has the second state, the transform and quantization block 235 may perform time domain-to-frequency domain transformation on the residual spatial-domain block RESIDUAL and may quantize the transformed residual block using rate-distortion optimization (RDO) or a given quantization parameter, thereby generating the quantized block QV. At this time, calculation of a representative value of residual spatial-domain block values is not performed in the transform and quantization block 235.

The inverse transform and inverse quantization block 237 may skip or perform the transformation of a block according to the state of the control signal TCS. When the control signal TCS has the first state, the inverse transform and inverse quantization block 237 may inverse-quantize the quantized block QV using an inverse quantization parameter to generate an inverse-quantized block without performing inverse transformation (e.g., frequency domain-to-time domain transformation) on the quantized block QV. The inverse transformation may be inverse DCT (IDCT) but is not restricted thereto.

The inverse quantization parameter may, in some embodiments, be based on and/or equivalent to quantization parameter QP selected by the transform and quantization block 235. The transform and quantization block 235 may transmit the quantization parameter QP to the inverse transform and inverse quantization block 237. In some embodiments, the inverse transform and inverse quantization block 237 may read the quantization parameter QP from the transform and quantization block 235.

The adder 239 may add the inverse-quantized block (but not has been inverse transformed) output from the inverse transform and inverse quantization block 237 and the predicted spatial-domain block PBL output from the mode decision block 233 to generate a reconstructed block RBL. The reconstructed block RBL may be transmitted to the de-blocking filter 241 and the intra prediction block 251.

When the control signal TCS has the second state, the inverse transform and inverse quantization block 237 may perform inverse transformation (e.g., frequency domain-to-time domain transformation) on the quantized block QV and inverse-quantize the inverse-transformed block using RDO or a given inverse quantization parameter to generate an inverse-quantized block.

The adder 239 may add the inverse-quantized block (i.e., the inverse-transformed and inverse-quantized block) output from the inverse transform and inverse quantization block 237 and the predicted spatial-domain block PBL output from the mode decision block 233 to generate a reconstructed block RBL. The reconstructed block RBL may be transmitted to the de-blocking filter 241 and the intra prediction block 251.

The de-blocking filter 241 may perform a de-blocking operation on the reconstructed block RBL received from the adder 239. The SAO filter 243 performs SAO filtering on the de-blocked block output from the de-blocking filter 241.

The frame buffer 245 may receive and/or store the SAO-filtered block output from the SAO filter 243. The frame buffer 245 may store a previous frame as a reference frame.

The motion estimation block 247 may receive the current spatial-domain block IFR and may process a current frame block by block based on the previous frame stored in the frame buffer 245. In detail, the motion estimation block 247 may transmit to the motion compensation block 249 position information PI of a block that matches the current spatial-domain block IFR the most among previous blocks included in the previous frame stored in the frame buffer 245.

The motion compensation block 249 may receive the position information PI, may read a block corresponding to the position information PI from the frame buffer 245, and may transmit the block to the mode decision block 233 as the second predicted block EBL2. The second predicted block EBL2 may be predicted based on the previous frame.

The intra prediction block 251 may receive the current spatial-domain block IFR and the reconstructed block RBL and may transmit a block that has been predicted using the reconstructed block RBL to the mode decision block 233 as the first predicted block EBL1. Accordingly, the first predicted block EBL1 may be predicted using a block that has been encoded in a frame. The entropy coder 253 may encode the quantized block QV received from the transform and quantization block 235 and output an encoded bitstream BS.

FIG. 4 is a diagram of a table including quantization parameters corresponding to representative values according to some embodiments of the inventive concept. Referring to FIGS. 1 through 4, quantization parameters QP corresponding to representative values may be stored in the table. The table may be stored in the at least one memory 400 and/or 401.

When the controller 200 is booted, the table stored in the at least one memory 400 and/or 401 may be stored in a storage medium (e.g., volatile memory or buffer memory) that can be accessed by the encoder 230. The storage medium may be included in the transform and quantization block 235. In some embodiments, the table may be stored in a storage medium that can be accessed by the encoder 230 and the storage medium may be non-volatile memory. The storage medium storing the table may be positioned at any place of the controller 200. Referring to the table illustrated in FIG. 4, each quantization parameter QP may correspond to a quantization step size QSS.

Here, the representative value may be a group representative value of the residual spatial-domain block values, a standard deviation of the residual spatial-domain block values, or a mean of absolute differences (MAD) of the residual spatial-domain block values, but the inventive concept is not restricted to these examples. The MAD may be a value obtained by dividing the SAD by the number of pixels included in a block.

FIG. 5 is an example conceptual diagram for explaining the operation of the subtractor 231 illustrated in FIG. 2, according to some embodiments. Referring to FIGS. 1 through 5, the subtractor 231 may subtract predicted spatial-domain block values included in the predicted spatial-domain block PBL (=B20) from current spatial-domain block pixel values included in the current spatial-domain block IFR (=B10), thereby generating residual spatial-domain block values included in the residual spatial-domain block RESIDUAL (=B30). Numerals included in each of blocks B10, B20, and B30 are just examples provided for clarity of the description. It is assumed that the blocks B10, B20, and B30 include 4*4 pixels representing images.

FIG. 6 is a diagram showing a quantization parameter corresponding to a representative value calculated according to some embodiments of the inventive concept and a quantized coefficient. Referring to FIGS. 5 and 6, the transform and quantization block 235 may select a quantization parameter from among a plurality of quantization parameters stored in the table illustrated in FIG. 4 using a group representative value of the residual spatial-domain block values included in the residual spatial-domain block RESIDUAL (=B30) in a first method METHOD1.

Referring to FIG. 5, the residual spatial-domain block values included in the residual spatial-domain block RESIDUAL (=B30) are "0" and "90". At this time, the transform and quantization block 235 may exclude the value "0" and estimate the value "90" as a representative value and may select a quantization parameter QP (=43) corresponding to the representative value (i.e., 90) from among the quantization parameters in the table illustrated in FIG. 4.

In some embodiments, if it is assumed that the quantization step size QSS is the same as the representative value (i.e., 90), quantized coefficients included in a block 41-1 may be "0" and "1", as shown in FIG. 6. In other words, in this non-limiting example, the residual value may 90 and/or the representative value may be 90. The inverse transform and inverse quantization block 237 may inverse-quantize the quantized block QV using an inverse quantization parameter the same as the quantization parameter QP (=43). A block 43-1 illustrated in FIG. 6 is the reconstructed block RBL output from the adder 239.

FIG. 7 is a diagram showing a quantization parameter corresponding to a representative value calculated according to other embodiments of the inventive concept and a quantized coefficient. Referring to FIGS. 5 and 7, the transform and quantization block 235 may calculate a MAD of the residual spatial-domain block values included in the residual spatial-domain block RESIDUAL (=B30) and may select a quantization parameter from among the quantization parameters stored in the table illustrated in FIG. 4 using the MAD in a second method METHOD2.

The residual spatial-domain block values included in the residual spatial-domain block RESIDUAL (=B30) are "0" and "90". At this time, the transform and quantization block 235 may calculate the MAD of the residual spatial-domain block values as a representative value and may select a quantization parameter QP (=31) corresponding to the MAD (i.e., 22.5) from among the quantization parameters in the table illustrated in FIG. 4.

According to some embodiments, if it is assumed that the quantization step size QSS is the same as the MAD (i.e., 22.5), quantized coefficients included in a block 41-2 may be "0" and "4 (=90/22.5)", i.e. the residual value=90 and the QSS=22.5 for selected QP=31 in FIG. 4, as shown in FIG. 7. The inverse transform and inverse quantization block 237 may inverse-quantize the quantized block QV using an inverse quantization parameter the same as the quantization parameter QP (=31). A block 43-2 illustrated in FIG. 7 is the reconstructed block RBL output from the adder 239.

FIG. 8 is a diagram showing a quantization parameter corresponding to a representative value calculated according to further embodiments of the inventive concept and a quantized coefficient. Referring to FIGS. 5 and 8, the transform and quantization block 235 may calculate a standard deviation of the residual spatial-domain block values included in the residual spatial-domain block RESIDUAL (=B30) and may select a quantization parameter from among the quantization parameters stored in the table illustrated in FIG. 4 using the standard deviation in a third method METHOD3.

The residual spatial-domain block values included in the residual spatial-domain block RESIDUAL (=B30) are "0" and "90". At this time, the transform and quantization block 235 may calculate the standard deviation of the residual spatial-domain block values as a representative value and may select a quantization parameter QP (=24) corresponding to the standard deviation (i.e., 10) from among the quantization parameters in the table illustrated in FIG. 4.

When it is assumed that the quantization step size QSS is the same as the standard deviation (i.e., 10), quantized coefficients included in a block 41-3 may be "0" and "9 (=90/10)", i.e. the residual value=90 and the QSS=10 for selected QP=24 in FIG. 4 as shown in FIG. 8. The inverse transform and inverse quantization block 237 may inverse-quantize the quantized block QV using an inverse quantization parameter the same as the quantization parameter QP (=24). A block 43-3 illustrated in FIG. 8 is the reconstructed block RBL output from the adder 239.

FIG. 9 is a conceptual diagram of a method of determining a representative value using grouping according to some embodiments of the inventive concept. Referring to FIGS. 1, 2, and 9, the subtractor 231 may subtract predicted spatial-domain block values included in the predicted spatial-domain block PBL 20A) from current spatial-domain block pixel values included in the current spatial-domain block IFR (=10A), thereby generating residual spatial-domain block values included in the residual spatial-domain block RESIDUAL (=30A). Numerals included in each of blocks 10A, 20A, and 30A are just examples provided for clarity of the description. It is assumed that the blocks 10A, 20A, and 30A include 4*4 pixels. The transform and quantization block 235 may select a quantization parameter from among the quantization parameters stored in the table illustrated in FIG. 4 using a group representative value of the residual spatial-domain block values included in the residual spatial-domain block RESIDUAL (=30A) in the first method METHOD1.

Referring to FIG. 9, the residual spatial-domain block values included in the residual spatial-domain block RESIDUAL (=30A) are "0", "10", and "90". At this time, the transform and quantization block 235 may group "0" into a first group, "10" into a second group, and "90" into a third group. The transform and quantization block 235 may calculate the greatest common divisor (i.e., 10) of "10" grouped into the second group and "90" grouped into the third group excluding the first group of "0" and may determine the greatest common divisor (i.e., 10) as the representative value. In some embodiments, the transform and quantization block 235 may exclude a group with a value of "0". The transform and quantization block 235 may select a quantization parameter QP (=24) corresponding to the representative value (i.e., 10) from among the quantization parameters stored in the table illustrated in FIG. 4.

FIG. 10 is a conceptual diagram of a method of determining a representative value using grouping according to other embodiments of the inventive concept. Referring to FIGS. 1, 2, and 10, the subtractor 231 may subtract predicted spatial-domain block values included in the predicted spatial-domain block PBL (=20B) from current spatial-domain block pixel values included in the current spatial-domain block IFR (=10B), thereby generating residual spatial-domain block values included in the residual spatial-domain block RESIDUAL (=30B). Numerals included in each of blocks 10B, 20B, and 30B are just examples provided for clarity of the description. It is assumed that the blocks 10B, 20B, and 30B include 4*4 pixels. The transform and quantization block 235 may select a quantization parameter from among the quantization parameters stored in the table illustrated in FIG. 4 using a group representative value of the residual spatial-domain block values included in the residual spatial-domain block RESIDUAL (=30B) in the first method METHOD1.

Referring to FIG. 10, the residual spatial-domain block values included in the residual spatial-domain block RESIDUAL (=30B) are "0", "9", "10", "11", and "90". In some embodiments, a group may be formed of values exceeding a threshold and/or between different thresholds. As used herein, "exceeding a threshold" may include all values greater than a given value or all values less than a given value. For example, the transform and quantization block 235 may group "0" into a first group; may group "9", "10", and "11" into a second group; and may group "90" into a third group. In this non-limiting example, thresholds of 5 and 20 may be applied as upper and lower limits for the second group. In this case, values of "9", "10", and "11" are between the upper and lower thresholds of 5 and 20, thereby including them in the second group. The transform and quantization block 235 may determine "10" as a representative value of "9", "10", and "11" of the second group.

The transform and quantization block 235 may calculate the greatest common divisor (i.e., 10) of "10", i.e., the representative value of the second group and "90" grouped into the third group excluding the first group of "0" and may determine the greatest common divisor (i.e., 10) as the representative value. In some embodiments, the transform and quantization block 235 may exclude groups including "0". The transform and quantization block 235 may select a quantization parameter QP (=24) corresponding to the representative value (i.e., 10) from among the quantization parameters stored in the table illustrated in FIG. 4.

The transform and quantization block 235 may group similar values, such as "9", "10", and "11", into one group and may determine a representative, such as a mean, of "9", "10", and "11" as a representative value of the group. In another example, the transform and quantization block 235 may group similar values, such as "10", "12", and "14", into one group and may determine a representative, such as a mean, of "10", "12", and "14" as a representative value of the group.

FIG. 11 is a conceptual diagram of a method of determining a representative value using grouping according to further embodiments of the inventive concept. Referring to FIGS. 1, 2, and 11, the subtractor 231 may subtract predicted spatial-domain block values included in the predicted spatial-domain block PBL (=20C) from current spatial-domain block pixel values included in the current spatial-domain block IFR (=10C), thereby generating residual spatial-domain block values included in the residual spatial-domain block RESIDUAL (=30C). Numerals included in each of blocks 10C, 20C, and 30C are just examples provided for clarity of the description. It is assumed that the blocks 10C, 20C, and 30C include 4*4 pixels of an image.

The transform and quantization block 235 may select a quantization parameter from among the quantization parameters stored in the table illustrated in FIG. 4 using a group representative value of the residual spatial-domain block values included in the residual spatial-domain block RESIDUAL (=30C) in the first method METHOD1. Referring to FIG. 11, the residual spatial-domain block values included in the residual spatial-domain block RESIDUAL (=30C) are "0", "1", "2", "3", "10", and "90". At this time, the transform and quantization block 235 may group "0", "1", "2", and "3" into a first group; may group "10" into a second group; and may group "90" into a third group.

The transform and quantization block 235 may calculate the greatest common divisor (i.e., 10) of "10" grouped into the second group and "90" grouped into the third group excluding the first group including "0", "1", "2", and "3" and may determine the greatest common divisor (i.e., 10) as the representative value. In other words, the transform and quantization block 235 may exclude the first group including values less than a reference value. Although the reference value is "4" in the embodiments illustrated in FIG. 11, the reference value may vary with embodiments. The transform and quantization block 235 may exclude groups including "0" in some embodiments. The transform and quantization block 235 may select a quantization parameter QP (=24) corresponding to the representative value (i.e., 10) from among the quantization parameters stored in the table illustrated in FIG. 4.

Figure 12:
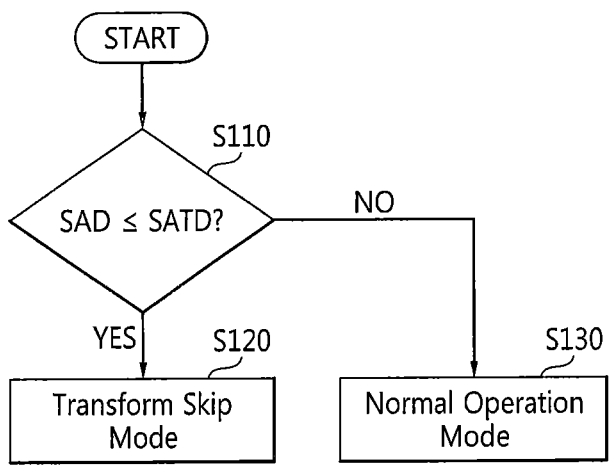
FIG. 12 is a flowchart of a method of controlling transform skip mode according to some embodiments of the inventive concept.

FIG. 12 is a flowchart of a method of controlling transform skip mode according to some embodiments of the inventive concept. Referring to FIGS. 2 and 12, the transform control signal generator 233-1 may compare the SAD of current spatial-domain block pixel values with the SATD of frequency domain values derived from the current spatial-domain block pixel values in operation S110.

When the SAD is equal to or less than the SATD (i.e., in case of YES) in operation S110, the transform control signal generator 233-1 may generate the control signal TCS having the first state. The transform and quantization block 235 may skip time domain-to-frequency domain transformation in response to the control signal TCS having the first state. The inverse transform and inverse quantization block 237 may skip frequency domain-to-time domain transformation in response to the control signal TCS having the first state. In other words, the transform and quantization block 235 and the inverse transform and inverse quantization block 237 may operate in the transform skip mode in operation S120.

However, when the SAD is greater than the SATD (i.e., in case of NO) in operation S110, the transform control signal generator 233-1 may generate the control signal TCS having the second state. The transform and quantization block 235 may perform the time domain-to-frequency domain transformation in response to the control signal TCS having the second state. The inverse transform and inverse quantization block 237 may perform the frequency domain-to-time domain transformation in response to the control signal TCS having the second state. In other words, the transform and quantization block 235 and the inverse transform and inverse quantization block 237 may operate in a normal operation mode in operation S130. The SAD of 4*4 pixels is 4 in spatial domain corresponding to time domain and the SATD of 4*4 pixels is 16 in frequency domain corresponding to the spatial domain.

Figure 13:
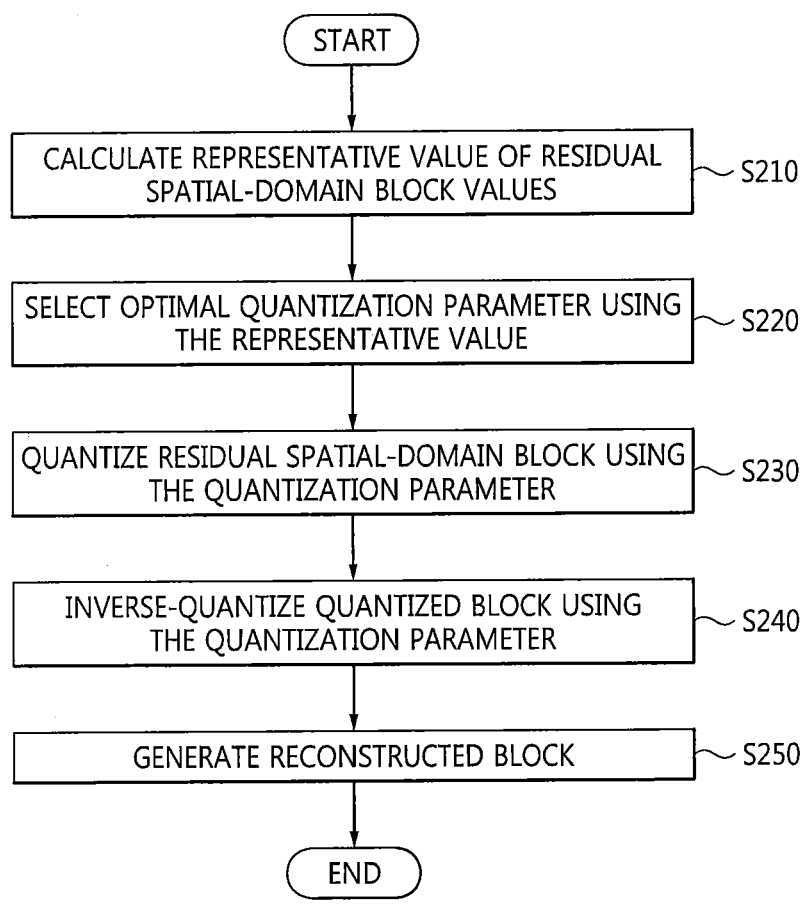
FIG. 13 is a flowchart of a method of operating an encoder according to some embodiments of the inventive concept.

FIG. 13 is a flowchart of a method of operating the encoder 230 according to some embodiments of the inventive concept. Referring to FIGS. 1 through 13, the subtractor 231 may generate residual spatial-domain block values included in the residual spatial-domain block RESIDUAL in the transform skip mode.

The transform and quantization block 235 may calculate a representative value of the residual spatial-domain block values included in the residual spatial-domain block RESIDUAL in the spatial domain in operation S210. Methods of calculating the representative value have been described above with reference to FIGS. 5 through 11. The transform and quantization block 235 may select an optimal quantization parameter from among the quantization parameters included in the table illustrated in FIG. 4 using the calculated representative value in operation S220.

The transform and quantization block 235 may quantize the residual spatial-domain block RESIDUAL using the optimal quantization parameter to output the quantized block QV in operation S230. The inverse transform and inverse quantization block 237 may inverse-quantize the quantized block QV using the optimal quantization parameter selected by the transform and quantization block 235 in operation S240. The adder 239 may add the inverse-quantized block output from the inverse transform and inverse quantization block 237 and the predicted spatial-domain block PBL to generate the reconstructed block RBL in operation S250.

As described above, according to some embodiments of the inventive concept, an encoder may not perform RDO in transform skip mode, thereby reducing the amount of computation necessary to determine an encoding quantization parameter. In addition, the encoder can select an optimal encoding quantization parameter corresponding to a representative value of residual spatial-domain block values from among quantization parameters stored in a table.

Other devices, methods, and/or systems according to embodiments of present inventive concepts will be or become apparent to one with skill in the art upon review of the drawings and detailed description. It is intended that all such additional devices and/or systems be included within this description, be within the scope of present inventive concepts, and be protected by the accompanying claims. Moreover, it is intended that all embodiments disclosed herein can be implemented separately or combined in any way and/or combination. The embodiments described herein may be implemented as software, hardware, and/or a combination thereof. Furthermore, the flowchart blocks illustrated herein may, in some embodiments, correspond to respective modules (which may have corresponding circuitry) that perform the operations illustrated in the flowchart blocks. For example, a image processing and/or data processing system 100 of FIG. 1 described herein may optionally have modules configured to perform the operations illustrated in FIGS. 12 and 13.

In the drawings and specification, there have been disclosed typical embodiments and, although specific terms are employed, they are used in a generic and descriptive sense only and not for purposes of limitation. While the inventive concept has been particularly shown and described with reference to example embodiments thereof, it will be understood by those of ordinary skill in the art that various changes in forms and details may be made therein without departing from the spirit and scope of the inventive concept as defined by the following claims.

What is claimed is:

1. A system on chip comprising:
an image signal processor circuit configured to transform first data in a first format into second data in a second format; and
an encoder circuit configured to encode the second data in the second format,
wherein the encoder circuit comprises:
a mode decision block configured to generate, by comparing a first value generated using the current spatial-domain pixel values with a second value generated using frequency domain values, a control signal comprising a first state indicating not performing a transformation or a second state indicating performing the transformation and configured to generate predicted spatial-domain block values for current spatial-domain block pixel values corresponding to the second data;
a subtractor configured to generate residual spatial-domain block values based on differences between the current spatial-domain block pixel values and the predicted spatial-domain block values; and
a transform and quantization block configured to calculate a representative value of the residual spatial-domain block values in response to the control signal having the first state indicating not performing a transformation, to select a quantization parameter corresponding to the representative value from among a plurality of quantization parameters, and to quantize the residual spatial-domain block values using the selected quantization parameter.

2. The system on chip of claim 1, wherein the transform and quantization block skips a transform operation of transforming the residual spatial-domain block values into frequency domain values and calculates the representative value of the residual spatial-domain block values in response to the control signal having the first state; and
wherein the transform and quantization block performs the transform operation in response to the control signal having the second state and quantizes transformed residual blocks resulting from the transform operation using rate-distortion optimization or a given quantization parameter.

3. The system on chip of claim 2, wherein the mode decision block comprises a transform control signal generator configured to generate the first value using the current spatial-domain block pixel values, to generate the second value using frequency domain values derived from the current spatial-domain block pixel values, to generate the control signal having the first state in response to the first value being equal to or less than the second value, and to generate the control signal having the second state in in response to the first value being greater than the second value.

4. The system on chip of claim 3, wherein the first value is a sum of absolute differences (SAD) of the current spatial-domain block pixel values and the second value is a sum of absolute transformed differences (SATD) of the frequency domain values derived from the current spatial-domain block pixel values.

5. The system on chip of claim 1, wherein the transform and quantization block groups the residual spatial-domain block values excluding values less than a reference value into a plurality of groups, calculates a greatest common divisor of grouped values, and determines the greatest common divisor as the representative value.

6. The system on chip of claim 1, wherein the transform and quantization block calculates a standard deviation of the residual spatial-domain block values and selects the standard deviation as the representative value.

7. The system on chip of claim 1, wherein the transform and quantization block calculates a mean of absolute differences (MAD) of the residual spatial-domain block values and determines the MAD as the representative value.

8. The system on chip of claim 1, further comprising a memory configured to store a table including the plurality of quantization parameters, wherein the transform and quantization block selects the quantization parameter corresponding to the representative value from among the plurality of quantization parameters included in the table.

9. A mobile computing device comprising:
a camera;
an image signal processor circuit configured to transform first data output in a first format from the camera into second data in a second format; and
an encoder circuit configured to encode the second data in the second format,
wherein the encoder circuit comprises:
a mode decision block configured to generate, by comparing a first value generated using current spatial-domain pixel values with a second value generated using frequency domain values, a control signal comprising a first state indicating not performing a transformation or a second state indicating performing the transformation, and configured to generate predicted spatial-domain block values for current spatial-domain block pixel values corresponding to the second data;
a subtractor configured to generate residual spatial-domain block values based on differences between the current spatial-domain block pixel values and the predicted spatial-domain block values; and
a transform and quantization block configured to calculate a representative value of the residual spatial-domain block values in response to the control signal having the first state indicating not performing a transformation, to select a quantization parameter corresponding to the representative value from among a plurality of quantization parameters, and to quantize the residual spatial-domain block values using the selected quantization parameter, wherein the transform and quantization block skips a transform operation of transforming the residual spatial-domain block values into frequency domain values and calculates the representative value of the residual spatial-domain block values in response to the control signal having the first state; and wherein the transform and quantization block performs the transform operation in response to the control signal having the second state and quantizes transformed residual blocks resulting from the transform operation using rate-distortion optimization or a given quantization parameter.

10. The mobile computing device of claim 9, wherein the transform and quantization block groups the residual spatial-domain block values excluding values less than a reference value into a plurality of groups, calculates a greatest common divisor of grouped values, and determines the greatest common divisor as the representative values.

11. The mobile computing device of claim 9, wherein the transform and quantization block calculates a standard deviation of the residual spatial-domain block values and determines the standard deviation as the representative value.

12. The mobile computing device of claim 9, wherein the transform and quantization block calculates a mean of absolute differences (MAD) of the residual spatial-domain block values and determines the MAD as the representative value.

13. The mobile computing device of claim 9, wherein the mode decision block is configured to generate the first value based on the current spatial-domain block pixel values, and to generate the second value using frequency domain values derived from the current spatial-domain block pixel values, wherein the first value is a sum of absolute differences (SAD) of the current spatial-domain block pixel values and the second value is a sum of absolute transformed differences (SATD) of the frequency domain values derived from the current spatial-domain block pixel values, and wherein the mode decision block is further configured to compare the first value with the second value, to generate the control signal having the first state in response to the first value being equal to or less than the second value, and to generate the control signal having the second state in in response to the first value being greater than the second value.

14. An encoder circuit configured to process current spatial-domain block pixel values, the encoder circuit comprising:
a memory circuit; and
a processor circuit configured to execute computer program instructions from the memory circuit to perform operations comprising:

determining residual spatial-domain block values based on respective differences between the current spatial-domain block pixel values and predicted spatial-domain block values;

determining a representative value associated with the residual spatial-domain block values based on a transform;

determining a quantization step size based on the representative value;

selecting a quantization parameter based on the quantization step size; and quantizing the residual spatial-domain block values based on the quantization parameter.

15. The encoder circuit of claim 14, wherein the transform comprises:
determining a Sum of Absolute Differences (SAD) value based on the current spatial-domain block pixel values;
determining a Sum of Absolute Transformed Differences (SATD) value based on frequency domain values derived from the current spatial-domain block pixel values; and
performing time domain to frequency domain transformation of the residual spatial-domain block values, in response to the SAD value being greater than the SATD value.

16. The encoder circuit of claim 15, the transform further comprising:
skipping time domain to frequency domain transformation of the residual spatial-domain block values, in response to the SAD value being less than or equal to the SATD value.

17. The encoder circuit of claim 14, wherein the transform comprises:
determining a group of residual spatial-domain block values comprising ones of the residual spatial-domain block values exceeding a threshold; and
selecting the representative value as a greatest common divisor of ones of the group of residual spatial-domain block values.

18. The encoder circuit of claim 14, wherein the transform comprises:
determining a standard deviation value of the residual spatial-domain block values; and
selecting the representative value as the standard deviation value.

19. The encoder circuit of claim 14, wherein the transform comprises:
determining a mean of absolute differences (MAD) value of the residual spatial-domain block values; and
selecting the representative value as the MAD value.

20. The encoder circuit of claim 14, wherein the selecting the quantization parameter based on the quantization step size comprises selecting a quantization parameter out of a plurality of quantization parameters that is nearest in value to the quantization step size that was determined.

* * * * *